US010115311B2

(12) United States Patent
Oh et al.

(10) Patent No.: US 10,115,311 B2
(45) Date of Patent: Oct. 30, 2018

(54) APPARATUS AND COMPUTER READABLE RECORDING MEDIUM FOR SITUATIONAL WARNING

(71) Applicants: HYUNDAI MOTOR COMPANY, Seoul (KR); KIA MOTORS CORPORATION, Seoul (KR)

(72) Inventors: Se Do Oh, Seoul (KR); Hyunyong No, Seoul (KR); Bogeun Kim, Seongnam-si (KR); Sung Ho Kim, Hanam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/604,024

(22) Filed: May 24, 2017

(65) Prior Publication Data
US 2018/0137759 A1  May 17, 2018

(30) Foreign Application Priority Data
Nov. 15, 2016 (KR) .................. 10-2016-0152004

(51) Int. Cl.
*G08G 1/16* (2006.01)
*H04W 4/02* (2018.01)
*H04W 4/029* (2018.01)

(52) U.S. Cl.
CPC ............ *G08G 1/166* (2013.01); *H04W 4/028* (2013.01); *H04W 4/029* (2018.02)

(58) Field of Classification Search
CPC ..................................... G08G 1/166

USPC ........................................................ 340/903
See application file for complete search history.

(56) References Cited

U.S. PATENT DOCUMENTS

| | | | |
|---|---|---|---|
| 9,230,442 B2* | 1/2016 | Bowers | B60Q 9/008 |
| 2006/0089787 A1* | 4/2006 | Burr | G01C 21/3469 |
| | | | 701/533 |
| 2011/0208646 A1* | 8/2011 | McMaster | G06Q 20/10 |
| | | | 705/39 |
| 2012/0313792 A1* | 12/2012 | Behm | G08G 1/0965 |
| | | | 340/902 |
| 2015/0345972 A1* | 12/2015 | Saito | B60L 11/1838 |
| | | | 701/521 |
| 2016/0009300 A1* | 1/2016 | Cooper | B61L 3/121 |
| | | | 701/20 |

(Continued)

FOREIGN PATENT DOCUMENTS

| | | |
|---|---|---|
| KR | 10-1555051 B1 | 9/2015 |
| KR | 10-2016-0013714 A | 2/2016 |

(Continued)

*Primary Examiner* — Santiago Garcia
(74) *Attorney, Agent, or Firm* — McDermott Will & Emery LLP

(57) ABSTRACT

An adverse situation warning device includes a route data storing portion for storing a first route data of a host vehicle including a first geohash corresponding to a moving route of the host vehicle, a route comparing portion for receiving a second route data of a remote vehicle including a second geohash corresponding to a moving route of the remote vehicle, and for comparing the geohash of the first route data and the geohash of the second route data, and a warning output portion for outputting an adverse situation warning based on the comparison result.

13 Claims, 9 Drawing Sheets

(56) References Cited

U.S. PATENT DOCUMENTS

| | | | |
|---|---|---|---|
| 2016/0119799 A1* | 4/2016 | Hutchins | H04W 24/04 |
| | | | 455/67.7 |
| 2016/0210858 A1* | 7/2016 | Foster | G08G 1/0965 |
| 2016/0362048 A1* | 12/2016 | Matthews | G01S 19/14 |
| 2017/0089717 A1* | 3/2017 | White | G01C 21/3658 |
| 2017/0115126 A1* | 4/2017 | McMaster | G01C 21/3492 |
| 2017/0115666 A1* | 4/2017 | Kolhouse | G05D 1/0293 |
| 2017/0192429 A1* | 7/2017 | Tseng | G05D 1/0088 |
| 2017/0234687 A1* | 8/2017 | Tseng | G01C 21/34 |
| | | | 701/461 |
| 2017/0341641 A1* | 11/2017 | Miller | B60T 7/22 |
| 2017/0352268 A1* | 12/2017 | Colella | G08G 1/096791 |
| 2017/0364069 A1* | 12/2017 | Colella | A61B 5/747 |

FOREIGN PATENT DOCUMENTS

| | | |
|---|---|---|
| WO | 2016/13071 A1 | 1/2016 |
| WO | 2016/130701 A1 | 1/2016 |

\* cited by examiner

FIG. 5A

| First route data | | | |
|---|---|---|---|
| wyd5mg2 | — | wyd5mgg | wyd5mg6 | t point(Current point)     (t-n+1) point   (t-n) point

FIG. 5B

| Second route data | | | |
|---|---|---|---|
| wyd5mgg | wyd5mg6 | wyd5mty | — |
| ↑ | ↑ | ↑ | |
| t point | (t-1) point | (t-2) point | |

FIG. 5C

| Second route data | | | |
|---|---|---|---|
| wyd5mgg | Wyd5mty | wyd5mg6 | — | t point    (t-1) point    (t-2) point

FIG. 5D

| Second route data | | | |
|---|---|---|---|
| wyd5mg6 | wyd5mgg | wyd5mg4 | — | t point    (t-1) point    (t-2) point

APPARATUS AND COMPUTER READABLE RECORDING MEDIUM FOR SITUATIONAL WARNING

CROSS-REFERENCE TO RELATED APPLICATION

This application claims the benefit of priority to Korean Patent Application No. 10-2016-0152004, filed with the Korean Intellectual Property Office on Nov. 15, 2016, the entire contents of which are incorporated herein by reference.

TECHNICAL FIELD

The present disclosure relates to a device which detects an adverse situation at a front of a vehicle and outputs a warning based on a result of comparing a geohash corresponding to a moving route of a vehicle that experienced an adverse situation and a geohash corresponding to a moving route of a host vehicle, and to a computer readable recording medium which embodies such a method.

BACKGROUND

In some methods of warning of an adverse situation of a vehicle, a method of judging an adverse situation using a sensor of a vehicle and another method of warning of an adverse situation using shared communication between vehicles or a vehicle and the center may be used.

The method of using a sensor of a vehicle has high accuracy in that it collects situational information directly using the sensor or a camera of the vehicle and judges an adverse situation. However, if there is a corner or a ramp on a moving route of the vehicle, it may be difficult to collect situational information using the sensor or the camera after the corner or the ramp. Also, on the road where first, second and third vehicles are disposed in a row, the second vehicle located just behind the first vehicle which caused an adverse situation may notice the adverse situation ahead and change lanes promptly, but the third vehicle just behind the second vehicle may not react to the adverse situation properly because the third vehicle may notice the adverse situation only after the second vehicle has changed lanes.

A method of using communication between vehicles can deliver adverse situation information rapidly by delivering the adverse situation information to nearby vehicles through a terminal which enables short-range communication with the nearby vehicles. However, a transceiver which corresponds to a protocol according to the communication method may be purchased separately, and adverse situation information can be sent to the nearby vehicles in the transmission range. Also, to extend the transmission range of the adverse situation information, complicated processes of setting an information delivery direction according to the moving direction of the vehicle, the number of vehicles to which information is delivered according to vehicle speed, etc. are needed and hacking dangers also exist.

The method of using communication between the vehicle and the center can deliver adverse situation information to a plurality of vehicles using GPS coordinates and generally used communication protocols. However, complicated processes of finding a moving route of the vehicle using GPS coordinates, and calculating a moving direction and a distance to the vehicle that has experienced an adverse situation by extracting following vehicles on the road where the vehicle that experienced the adverse situation are needed.

Also, the above processes should be repeated until the adverse situation is resolved or avoided, so a delay of adverse situation information delivery is created.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a device, and a method and a computer readable recording medium which embodies the device and the method having advantages of detecting an adverse situation ahead and outputting warning according to the adverse situation, based on the result of comparing a geohash corresponding to a moving route of a vehicle which an adverse situation happened to and a geohash corresponding to a moving route of a host vehicle.

In addition to the object, an exemplary implementation of the present disclosure may be used to accomplish other objects which are not mentioned specifically.

An adverse situation warning device according to an exemplary implementation of the present disclosure may include: a route data storing portion storing a first route data of a host vehicle including a first geohash corresponding to a moving route of the host vehicle; a route comparing portion receiving a second route data of a remote vehicle including a second geohash corresponding to a moving route of the remote vehicle, and comparing the geohash of the first route data and the geohash of the second route data; and a warning output portion outputting an adverse situation warning based on the comparison result.

The route comparing portion may compare a string of the geohash of the first route data and a string order of the geohash of the first route data with a string of the geohash of the second route data and a string order of the geohash of the second route data.

The route comparing portion may receive the second route data from a remote server.

The route comparing portion may monitor route data stored in the server through connection pooling.

The adverse situation warning device may further include: a global positioning system (GPS) receiver receiving at least one GPS signal and calculating a position coordinate of the host vehicle; and a geohash converter converting the position coordinate of the host vehicle into the geohash to generate the first route data The adverse situation warning device may further include: a control system generating a danger signal for informing an adverse situation of the host vehicle; and an adverse situation detector transmitting an adverse situation occurrence binary signal, the generated danger signal and the first route data to the server in response to the generation of the danger signal.

The danger signal may include at least one of airbag deployment signal, sudden stop signal, sudden deceleration signal and crash signal.

The warning output portion may receive the danger signal of the remote vehicle from the server, calculate degree of risk based on the danger signal, and output a warning based on the calculated result of the degree of risk.

A computer readable recording medium according to another exemplary implementation of the present disclosure may record program instructions for executing an adverse situation warning method through an adverse situation warning device. The computer readable recording medium may include: program instructions configured to store storing a first route data of a host vehicle including a geohash corresponding to a moving route of the host vehicle; program instructions configured to monitor a route data stored in a server; program instructions configured to receive a second route data including a geohash corresponding to a moving route of a remote vehicle in an adverse situation from the server; program instructions configured to compare a string of the geohash of the first route data and a string order of the geohash of the first route data with a string of the geohash of the second route data and a string order of the geohash of the second route data; and program instructions configured to output an adverse situation warning based on the comparison result.

The program instructions configured to monitor a route data stored in a server, when executed, may monitor the route data stored in the server through connection pooling.

The computer readable recording medium may further include: program instructions configured to receive at least one GPS signal; program instructions configured to calculate a position coordinate of the host vehicle based on the received GPS signal; and program instructions configured to generate and update the first route data by converting the calculated position coordinate into the geohash.

The computer readable recording medium may further include: program instructions configured to generate a danger signal informing an adverse situation of the host vehicle; and program instructions configured to transmit an adverse situation occurrence binary signal, the generated danger signal and the first route data to the server in response to the generation of the danger signal.

The danger signal may include at least one of airbag deployment signal, sudden stop signal, sudden deceleration signal and crash signal.

The program instructions configured to output an adverse situation warning, when executed, may receive the danger signal of the remote vehicle, calculate degree of risk based on the danger signal, and output a warning based on the calculated result of the degree of risk.

According to an exemplary implementation of the present disclosure, warning may be output by recognizing an adverse situation occurring on a host vehicle's moving route in a short time. Also, warning type and range may be changed depending on the seriousness of the adverse situation.

BRIEF DESCRIPTION OF THE DRAWINGS

FIG. 5A to FIG. 5D illustrate a route data comparison method according to exemplary implementations of the present disclosure.

DETAILED DESCRIPTION

Figure 1:
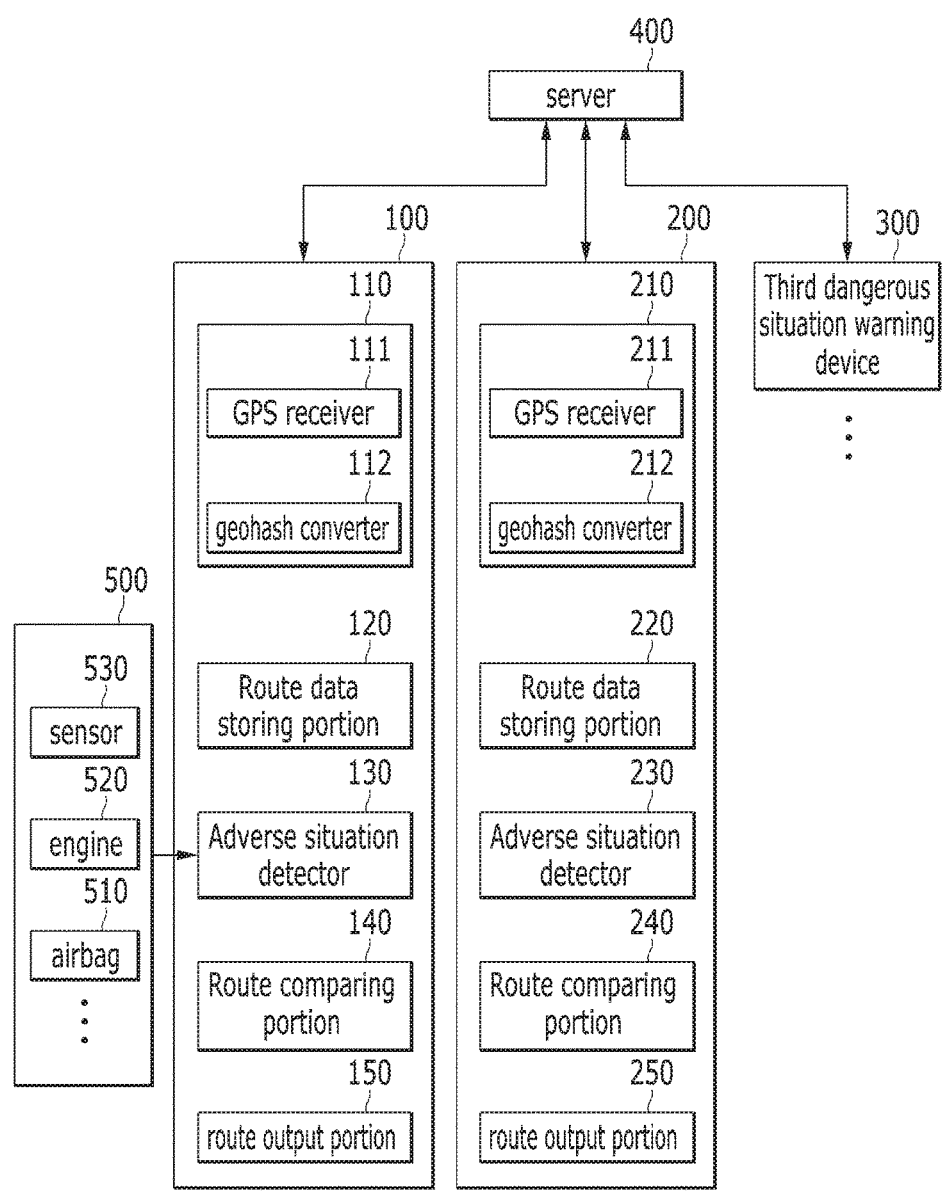
FIG. 1 shows a schematic configuration of an adverse situation warning device according to an exemplary implementation of the present disclosure.

The present disclosure will be described more fully hereinafter with reference to the accompanying drawings, in which exemplary implementations of the disclosure are shown. As those skilled in the art would realize, the described implementations may be modified in various different ways, all without departing from the spirit or scope of the present disclosure. To describe the present disclosure explicitly in the drawing, a part which is not related to the description is omitted and the same reference numeral is used to the same or similar constituent elements in the entire specification. Also, in case of generally known prior art, the detailed description is omitted.

It will be further understood, unless it is explicitly described to the contrary, that the terms "comprises", "includes", "including" and/or "comprising," when used in this specification, specify the presence of stated features, integers, steps, operations, elements, and/or components, but do not preclude the presence or addition of one or more other features, integers, steps, operations, elements, components, and/or groups thereof. Also, the terminology such as " . . . portion", "device", etc. in the specification means a unit which processes at least one function or one operation, and this can be embodied by a combination of hardware or software or hardware and software.

FIG. 1 illustrates a configuration of an adverse situation warning device according to exemplary implementations of the present disclosure.

In FIG. 1, a first adverse situation warning device 100, a second adverse situation warning device 200 and a third adverse situation warning device 300 are connected with a server 400 through a wireless communication network. Herein, the first adverse situation warning device 100 is located in a first vehicle, the second adverse situation warning device 200 is located in a second vehicle, and the third adverse situation warning device 300 is located in a third vehicle.

In FIG. 1 and this specification, a detailed configuration of the first adverse situation warning device 100 is shown and described. However, this is only for convenience of description and is therefore non-limiting, and the second adverse situation warning device 200 and third adverse situation warning device 300 also include the same or a similar configuration to the first adverse situation warning device 100.

As shown in FIG. 1, the first adverse situation warning device 100 sends route data of the first vehicle to the server 400 when the first adverse situation warning device 100 detects an adverse situation, and outputs a warning by monitoring a route on which the adverse situation occurs based on other route data stored in the server 400.

As shown in FIG. 1, the first adverse situation warning device 100 includes a route data generator 110, a route data storing portion 120, an adverse situation detector 130, a route comparing portion 140 and a warning output portion 150.

The route data generator 110 generates route data of the first vehicle, stores the route data of the first vehicle in the route data storing portion 120, and includes a global positioning system (GPS) receiver 111 and a geohash converter 112.

The GPS receiver 111 receives GPS coordinates and a time sent from a plurality of satellites in real time and calculates a current location of the first vehicle. Here, the current location of the first vehicle includes the GPS coordinate (latitude and longitude).

The geohash converter 112 converts the GPS coordinate of the first vehicle which is calculated by the GPS receiver 111 into geohash. The geohash is one method, or system, of latitude and longitude coordinate systems which represent strings by mapping the GPS coordinates in lattice zones, and can encode the GPS coordinate into the geohash or decode the geohash to the GPS coordinate. Also, the geohash represents two GPS coordinates as one code through 6 to 10-digit string, and controls the lattice size by changing the digit of code. Therefore, in a case of changing the route data of the vehicle from the GPS coordinate to the geohash, a dimension of the route data can be reduced.

Figure 2:
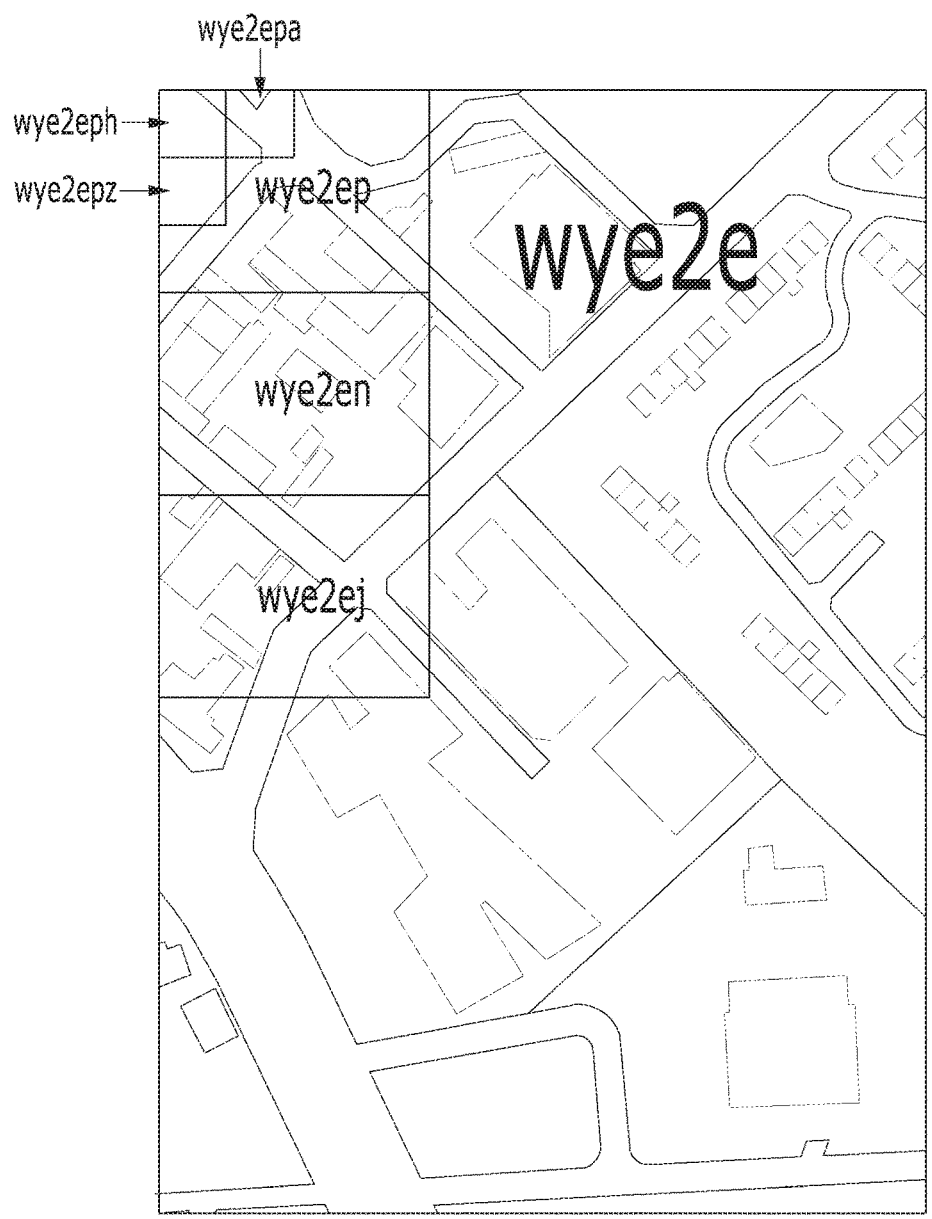
FIG. 2 shows an exemplary lattice size according to a digit of geohash.

FIG. 2 shows a lattice size according to a digit of geohash. The lattice sizes of 5-digit string geohash (wye2e), 6-digit string geohash (wye2ep, wye2en, wye2ej) and 7-digit string geohash (wye2eph, wye2epz, wye2epa) can be seen in FIG. 2.

Referring to FIG. 1, the geohash converter 112 according to exemplary implementations of the present disclosure determines whether the first vehicle moves based on a change of the GPS coordinate calculated from the GPS receiver 111, and if the first vehicle is determined on the move, the route data is generated by converting the calculated GPS coordinate into the geohash. In detail, if a first GPS coordinate (a location of the first vehicle at time t−1) is different from a second GPS coordinate (a location of the first vehicle at time t), the first vehicle is determined to be moving. Then, the route data is generated by converting the first GPS coordinate and the second GPS coordinate to the geohashes, and is stored in the route data storing portion 120.

The route data storing portion 120 stores the route data of the first vehicle on the move as the geohashes. The route data storing portion 120 according to exemplary implementations of the present disclosure updates and saves the route data using the geohashes which are sequentially converted through the geohash converter 112.

In case the adverse situation of the first vehicle on the move is detected, the adverse situation detector 130 sends an adverse situation occurrence binary signal and the route data which is stored in the route data storing portion 120 to the server 400. At this time, the route data includes the location of the first vehicle when the adverse situation of the first vehicle is detected.

The adverse situation detector 130 according to the exemplary implementation of the present disclosure determines the adverse situation in case a danger signal sent from a plurality of control systems 500 in the vehicle is received. For example, in case one or more of airbag deployment signals sent from an airbag control system 510, a sudden stop/deceleration signal from an engine control system 520, or a crash signal from a sensor 530 is received, the first vehicle is determined to be in the adverse situation. At this time, the detected danger signal (the signal of airbag deployment, sudden stop, sudden deceleration, crash, etc.) may be sent with the adverse situation occurrence binary signal and the route data to the server 400.

The route comparing portion 140 monitors a database of the server 400, receives other danger signals and route data stored in the database, and determines whether to output a warning according to a comparison result of the received route data and the route data of the first vehicle stored in the route data storing portion 120.

The route comparing portion 140 according to exemplary implementations of the present disclosure identifies the route data of the adverse vehicle stored in the database of the server 400 using connection pooling method. This enables the route comparing portion 140 to monitor the route data of the adverse vehicle stored in the database at short intervals. Also, even if a plurality of adverse situation warning devices such as the first adverse situation warning device 100, the second adverse situation warning device 200, the third adverse situation warning device 300, etc. are connected to the server 400 simultaneously, overhead may be reduced.

The route comparing portion 140 according to the exemplary implementation of the present disclosure determines that warning is needed in case that the geohashes change in the same order (the first vehicle moves along the same route as the adverse vehicle) in the result of comparing the route data of the adverse vehicle and the geohashes of the route data of the first vehicle sequentially. Also, in a case that the geohashes change in reverse order (the first vehicle moves to an opposite direction of the adverse vehicle), the route comparing portion 140 determines that warning is not needed.

The route comparing portion 140 according to exemplary implementations of the present disclosure extracts geohashes within a predetermined distance from the current location if other danger signals stored in the database of the server 400 include signals of airbag deployment and crash. Then, if a moving route of the first vehicle (host vehicle) is the same as the adverse vehicle (remote vehicle), or includes at least one of the geohashes which are extracted from the route data of first vehicle, it is determined that a warning is needed.

The warning output portion 150 outputs the warning through the comparing portion 140 if the comparing portion 140 determines a warning of the first vehicle is needed.

The warning output portion 150 according to exemplary implementations of the present disclosure receives the danger signal corresponding to the route data of the adverse vehicle, calculates a degree of risk based on the received danger signal, and changes and outputs the warning types according to the degree of risk. In detail, the warning output portion 150 controls outputs to a vehicle inside warning and/or vehicle outside warning, or a warning method (LED, sound, forced flickering of hazard light, etc.).

For example, in a case that the received danger signal includes the signal corresponding to sudden deceleration or sudden stop, it is determined the degree of risk is 'low' and the warning is outputted to the inside of the first vehicle. Also, in case that the received danger signal includes the signal corresponding to airbag deployment or crash, it is determined that the degree of risk is 'medium' and the warning is outputted to the outside of first vehicle. Also, in case that the received danger signal includes the signal corresponding to airbag deployment and crash, it is determined that the degree of risk is 'high' and the warning is outputted to the inside and outside of first vehicle simultaneously.

The server 400 in FIG. 1 stores the route data and the danger signal of the first vehicle sent from the first adverse situation warning device 100 in the database in case that the adverse situation occurrence binary signal is received from the first adverse situation warning device 100. Also, in a case that an adverse situation termination binary signal is received from the first adverse situation warning device 100, the route data and the danger signal of the first vehicle stored in the database may be deleted.

Figure 3:
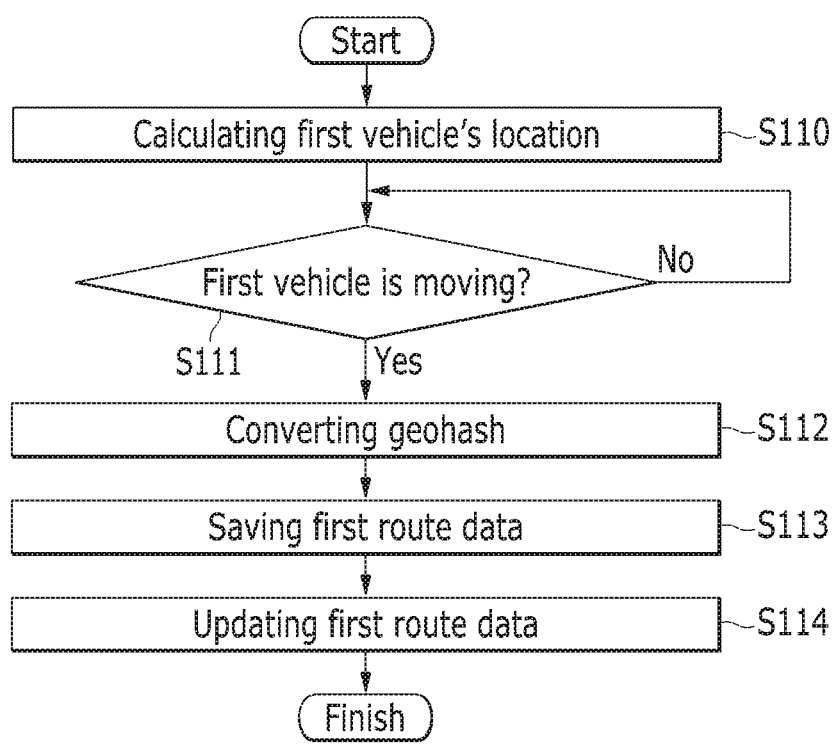
FIG. 3 is a flowchart showing a route data generation method using the adverse situation warning device of FIG. 1.

FIG. 3 shows a route data generation method using the adverse situation warning device of FIG. 1.

The first adverse situation warning device 100 calculates the location of the first vehicle through the GPS receiver 111 at step S110.

After that, if the geohash converter 112 determines at step S111 that the first vehicle is moving based on the location coordinates calculated at the step S110, the location coordinates are converted to the geohashes and are stored in the route data storing portion 120 as a first route data at steps S112 and S113.

Then, the first route data stored at the step S113 is updated by sequentially converting the location coordinates of the first vehicle calculated through the GPS receiver 111 to the geohashes at step S114.

Meanwhile, the second adverse situation warning device 200 and the third adverse situation warning device 300 can generate and update a second route data and a third route data respectively.

Figure 4:
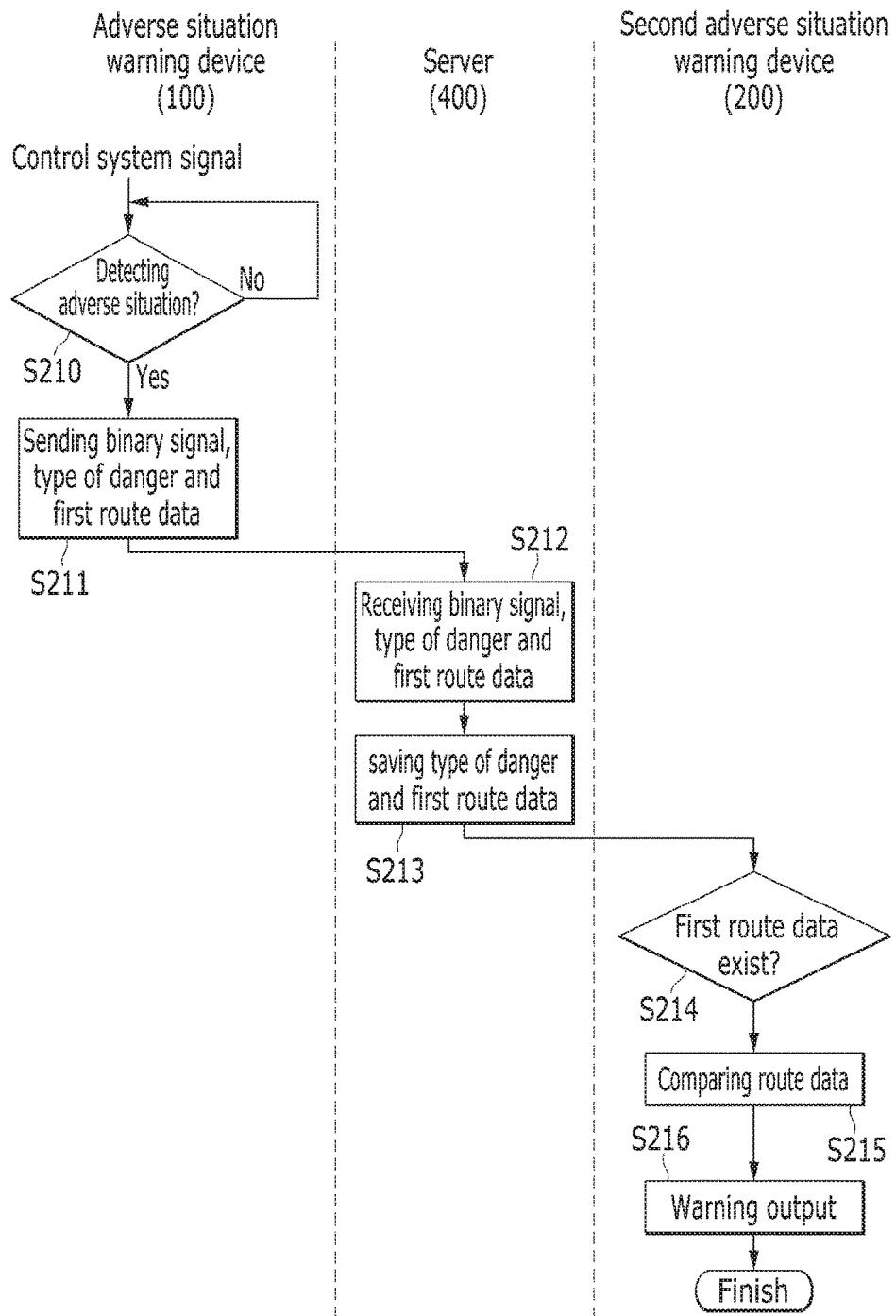
FIG. 4 is a flowchart showing an adverse situation warning method using the adverse situation warning device of FIG. 1.

FIG. 4 shows an adverse situation warning method using the adverse situation warning device of FIG. 1.

First, whether the adverse situation occurs or not is determined at step S210 by receiving the danger signal sent from a plurality of control systems 500 in the first vehicle through the first adverse situation warning device 100.

If it is determined that the adverse situation has occurred at the step S210, the adverse situation occurrence binary signal, the danger signal and the first route data stored in the route data storing portion 120 are sent to the server 400 at step S211. The first route data sent at the step S211 includes the adverse situation occurrence location of the first vehicle.

The server 400 receives the binary signal, the danger signal and the first route data at step S212, and stores the danger signal and the first route data in the database at step S213.

Then, the route comparing portion 240 of the second adverse situation warning device 200 can monitor the database in the server 400 through a connection pooling method. Therefore, if the first route data exists in the database in the server 400 at step S214, the route comparing portion 240 of the second adverse situation warning device 200 receives the first route data and compares to the second route data stored in the route data storing portion 220 at step S215. The method of how to compare the first route data and the second route data at the step S215 will be described in detail, with reference to FIG. 5.

FIG. 5A to FIG. 5D show a route data comparison method according to exemplary implementations of the present disclosure.

Referring to FIG. 5A, the first route data shows the moving route from a starting location of the first vehicle to the adverse situation occurrence location, and the moving route is represented as wyd5mg2, . . . , wyd5mgg, wyd5mg6 from the geohash of a current point to that of a past point.

As shown in FIG. 5B, in a case that the second route data is shown in order of wyd5mgg, wyd5mg6, wyd5mty, . . . , as wyd5mgg and wyd5mg6 are included in the first route data and the second route data in common and the order of wyd5mgg and wyd5mg6 in the first route data and the second route data is the same, the second vehicle is determined to move along the same route as the first vehicle. Also, it is determined that the warning is needed for the second vehicle.

As shown in FIG. 5C, in a case that the second route data is shown in order of wyd5mgg, wyd5mty, wyd5mg6, . . . , as the moving route of the second vehicle includes a part of the moving route of the first vehicle (wyd5mgg and wyd5mg6), it is determined that the warning is needed. In other words, if the geohashes of the second vehicle correspond to the geohashes of the first vehicle by at least the predetermined number and the order of the corresponding geohashes of the second vehicle is the same as the order of the corresponding geohashes of the first vehicle, it is determined that the warning is needed for the second vehicle.

As shown in FIG. 5D, in case that the second route data is shown in order of wyd5mg6, wyd5mgg, wyd5mg4, . . . , even though a part of the geohashes of the first route data corresponds to the geohashes of the second route data, the order of the corresponding geohashes of the second route data coincides with the order of the corresponding geohashes of the first route data in reverse, so it is determined that the second vehicle is moving in the opposite direction of the first vehicle. Therefore, it is determined that the warning is not needed for the second vehicle.

Referring to FIG. 4, if it is determined that the warning is needed to the second vehicle at the step S215, the warning is output through the warning output portion 250 at step S216. At the step S216, the degree of risk about the adverse situation of the first vehicle is determined based on the danger signal of the first vehicle, and the warning to the second vehicle can be output according to the result of the determining the degree of risk.

Figure 6:
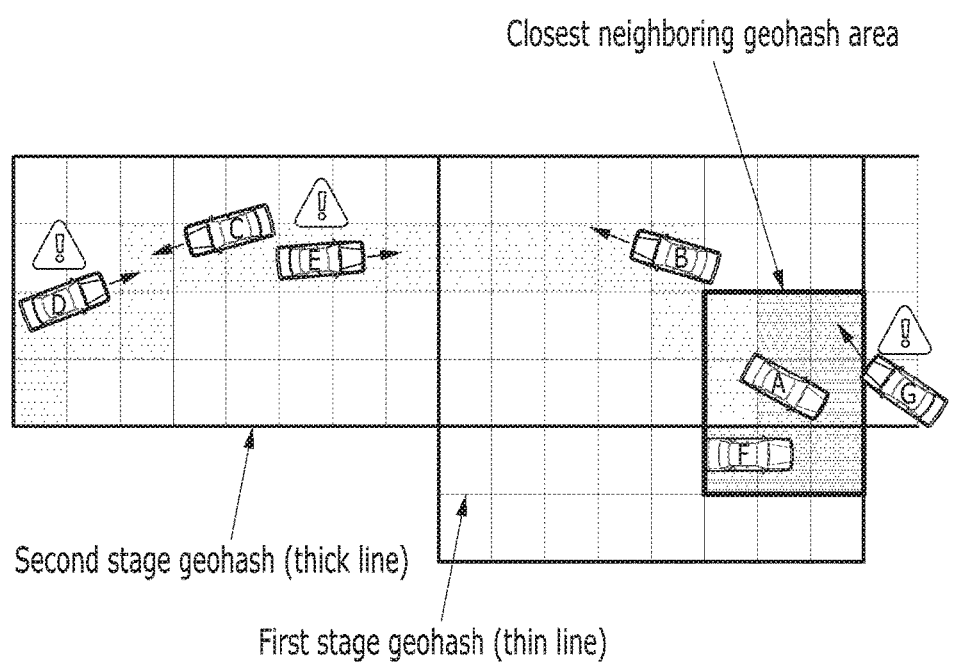
FIG. 6 shows a warning output method according to exemplary implementations of the present disclosure.

FIG. 6 shows a warning output method according to exemplary implementations of the present disclosure.

As shown in FIG. 6, on a condition that a plurality of vehicles are on the moving route of vehicle A in the adverse situation, the adverse situation warning devices in vehicle B, vehicle C, vehicle D, vehicle E and vehicle F receive the route data of the vehicle A, compare each vehicle's route data and output a warning according to the comparison result.

In detail, the vehicle B and the vehicle C include a part of vehicle A's route data, but they move in the opposite direction to the vehicle A. Therefore, a warning is not output. Also, the vehicle D and the vehicle E move in the same direction as the vehicle A, so the warning is output. Also, in a case that the danger signal of the vehicle A includes the signals of airbag deployment and a crash, the vehicle F located within the geohashes which are included within a predetermined distance from the vehicle A's current location (the geohashes closely neighboring the geohashes including the vehicle A's current location) and the vehicle G which is about to enter the geohashes output inside and/or outside warnings.

According to exemplary implementations of the present disclosure, recognition accuracy of an adverse situation can be improved by determining the adverse situation using an indicator inside the vehicle such as whether an engine of the vehicle works, whether sudden deceleration happens, or whether the airbag works or deploys, etc. Also, by setting a warning range depending on the seriousness of the adverse situation, other vehicles' inconvenience and damage caused by the vehicle in the adverse situation can be minimized According to exemplary implementations of the present disclosure, in a case that the geohashes corresponding to the moving route of the vehicle in the adverse situation is received, the host vehicle can detect the adverse situation on the moving route through a simple operation process of the vehicle terminal by comparing the geohashes corresponding to the moving route of the vehicle in the adverse situation and the string and the order of the string. Also, because unnecessary operations from the server, such as extracting the vehicles which have the same moving route as the vehicle in the adverse situation, extracting the following vehicles which are approaching the vehicle in the adverse situation, etc., are not needed, a time delay caused by data operation and transmission of the server can be minimized.

The adverse situation warning method according to exemplary implementations of the present disclosure can be recorded in a computer readable recording medium by initially installing a program to the medium or implementing the program installed by a user directly. Herein, a computer may include a desktop, a laptop, a smart phone, a tablet PC, a PDA (personal information terminal) and a mobile communication equipment, etc. Also, the recording medium may include ROM, RAM, CD-ROM, magnetic tape, floppy disk and optical recording medium, etc.

Therefore, the program which the adverse situation warning method according to exemplary implementations of the present disclosure is implemented executes a function saving the first route data, a function monitoring the route data stored in the server, a function receiving the second route data saved to the server, a function comparing the first route data geohashes and the second route data geohashes and a function outputting the adverse situation notice warning, etc.

Also, in this specification, the adverse situation warning method through communication between the vehicle and the center is described. However, the exemplary implementations of the present disclosure can be applied to a warning method through communication between vehicles through a slight modification and a change.

While this disclosure has been described in connection with what is presently considered to be practical exemplary implementations, it is to be understood that the disclosure is not limited to the disclosed implementations, but, on the contrary, is intended to cover various modifications and equivalent arrangements included within the spirit and scope of the appended claims.

What is claimed is:

1. An adverse situation warning device, comprising:
   a computer;
   a route data storing portion of the computer for storing a first route data of a host vehicle including a first geohash corresponding to a moving route of the host vehicle;
   a route comparing portion of the computer for receiving a second route data of a remote vehicle including a second geohash corresponding to a moving route of the remote vehicle, and for comparing the geohash of the first route data and the geohash of the second route data; and
   a warning output portion of the computer for outputting an adverse situation warning when the comparison result indicates the host vehicle and the remote vehicle are travelling in a similar direction,
   wherein the route comparing portion compares a string of the geohash of the first route data and a string order of the geohash of the first route data with a string of the geohash of the second route data and a string order of the geohash of the second route data.

2. The adverse situation warning device of claim 1, wherein the route comparing portion receives the second route data from a remote server.

3. The adverse situation warning device of claim 2, wherein the route comparing portion monitors route data stored in the server through connection pooling.

4. The adverse situation warning device of claim 1, further comprising:
   a global positioning system (GPS) receiver for receiving at least one GPS signal and calculating a position coordinate of the host vehicle; and
   a geohash converter for converting the position coordinate of the host vehicle into the geohash to generate the first route data.

5. The adverse situation warning device of claim 2, further comprising:
   a control system for generating a danger signal for informing of an adverse situation of the host vehicle; and
   an adverse situation detector for transmitting an adverse situation occurrence binary signal, the generated danger signal and the first route data to the server in response to the generation of the danger signal.

6. The adverse situation warning device of claim 5, wherein the danger signal includes at least one of an airbag deployment signal, a sudden stop signal, a sudden deceleration signal and a crash signal.

7. The adverse situation warning device of claim 5, wherein the warning output portion receives the danger signal of the remote vehicle from the server, calculates degree of risk based on the danger signal and outputs a warning based on the calculated result of the degree of risk.

8. A non-transitory computer readable recording medium which records program instructions on a computer for executing an adverse situation warning method through an adverse situation warning device, the computer readable recording medium comprising:
   program instructions for storing a first route data of a host vehicle including a geohash corresponding to a moving route of the host vehicle;
   program instructions for monitoring a route data stored in a server; program instructions for receiving a second route data including a geohash corresponding to a moving route of a remote vehicle in an adverse situation from the server;
   program instructions for comparing a string of the geohash of the first route data and a string order of the geohash of the first route data with a string of the geohash of the second route data and a string order of the geohash of the second route data; and
   program instructions for outputting an adverse situation warning when the comparison result indicates the host vehicle and the remote vehicle are travelling in a similar direction,
   wherein the non-transitory computer readable recording medium includes at least one of ROM, RAM, CD-ROM, a magnetic tape, a floppy disk and an optical recording medium.

9. The computer readable recording medium of claim 8, wherein the program instructions for monitoring a route data stored in a server, when executed, monitors the route data stored in the server through connection pooling.

10. The computer readable recording medium of claim 8, further comprising:
    program instructions for receiving at least one GPS signal;
    program instructions for calculating a position coordinate of the host vehicle based on the received GPS signal; and
    program instructions for generating and updating the first route data by converting the calculated position coordinate into the geohash.

11. The computer readable recording medium of claim 8, further comprising:
    program instructions for generating a danger signal informing of an adverse situation of the host vehicle; and
    program instructions for transmitting an adverse situation occurrence binary signal, the generated danger signal and the first route data to the server in response to the generation of the danger signal.

12. The computer readable recording medium of claim 11, wherein the danger signal includes at least one of an airbag deployment signal, a sudden stop signal, a sudden deceleration signal and a crash signal.

13. The computer readable recording medium of claim 11, wherein the program instructions for outputting an adverse situation warning, when executed, receives the danger signal of the remote vehicle, calculates degree of risk based on the danger signal, and outputs a warning based on the calculated result of the degree of risk.

* * * * *